US009258943B1

(12) United States Patent
Ruger

(10) Patent No.: US 9,258,943 B1
(45) Date of Patent: Feb. 16, 2016

(54) PLANT EXTRACTION ASSEMBLY

(71) Applicant: John W. Ruger, Kingman, AZ (US)

(72) Inventor: John W. Ruger, Kingman, AZ (US)

( * ) Notice: Subject to any disclaimer, the term of this patent is extended or adjusted under 35 U.S.C. 154(b) by 274 days.

(21) Appl. No.: 13/960,182

(22) Filed: Aug. 6, 2013

(51) Int. Cl.
*A01D 43/077* (2006.01)

(52) U.S. Cl.
CPC ..................... *A01D 43/077* (2013.01)

(58) Field of Classification Search
CPC ........ A01D 43/077; F16D 7/002; F16D 7/021
USPC ................... 30/124, 276; 56/12.7, 17; 464/30
See application file for complete search history.

(56) References Cited

U.S. PATENT DOCUMENTS

| | | | | |
|---|---|---|---|---|
| 1,990,991 A * | 2/1935 | Heubach | | 409/137 |
| 2,243,189 A * | 5/1941 | Brannan | | 416/243 |
| 2,539,630 A * | 1/1951 | Krueger et al. | | 464/32 |
| 2,543,396 A * | 2/1951 | Wolff | | 192/56.5 |
| 3,146,612 A * | 9/1964 | Lorenz | | 464/30 |
| 3,212,296 A * | 10/1965 | Benjamen | | 464/8 |
| 3,429,112 A * | 2/1969 | Wells et al. | | 56/295 |
| 3,442,360 A * | 5/1969 | Fulop | | 192/56.61 |
| 3,792,593 A * | 2/1974 | Loos et al. | | 62/262 |
| 3,905,181 A | 9/1975 | Messner | | |
| 4,286,441 A * | 9/1981 | Scheneman et al. | | 464/36 |
| 4,723,802 A | 2/1988 | Fambrough | | |
| 4,765,127 A * | 8/1988 | Hamblen | | 56/295 |
| 4,964,472 A | 10/1990 | Cleworth | | |
| 5,588,289 A * | 12/1996 | Wilson | | 56/13.1 |
| 5,704,511 A * | 1/1998 | Kellams | | 220/495.07 |
| 5,862,595 A * | 1/1999 | Keane | | 30/124 |
| 5,865,259 A | 2/1999 | Catto | | |
| 6,105,253 A * | 8/2000 | Kolbert | | 30/124 |
| 6,287,204 B1 * | 9/2001 | Kobayashi | | 464/29 |
| 6,340,061 B2 | 1/2002 | Marshall et al. | | |
| 6,398,654 B1 * | 6/2002 | Viaud | | 464/33 |
| 7,784,254 B2 * | 8/2010 | Bever | | 56/255 |
| 8,479,949 B2 * | 7/2013 | Henkel | | 220/835 |
| 2004/0237316 A1 * | 12/2004 | Chen | | 30/277.4 |
| 2007/0209346 A1 | 9/2007 | Bovo et al. | | |
| 2008/0110026 A1 | 5/2008 | Marcoe | | |
| 2008/0127621 A1 * | 6/2008 | Bovo et al. | | 56/12.9 |
| 2010/0146794 A1 | 6/2010 | Marcoe | | |
| 2012/0213632 A1 * | 8/2012 | Parry et al. | | 415/208.1 |
| 2013/0111699 A1 * | 5/2013 | Genoa et al. | | 15/414 |

* cited by examiner

*Primary Examiner* — Ned Landrum
*Assistant Examiner* — Evan MacFarlane

(57) ABSTRACT

A plant extraction assembly includes a housing that may be worn on a user's back. A flexible hose is fluidly coupled to and extends from the housing. A tube is fluidly coupled to a second end of the hose. A motor is coupled to a first end of the tube. A shaft is positioned within the tube. The shaft is rotationally coupled to the motor. A blade is coupled to the shaft. The blade is positioned at a second end of the tube so the blade may contact a plant positioned adjacent to the second end of the tube. A propeller is coupled to the shaft. The propeller provides from the second end of the tube into the tube. The propeller may urge pieces of the plant cut by the blade upwardly through the tube and the hose into the housing.

17 Claims, 10 Drawing Sheets

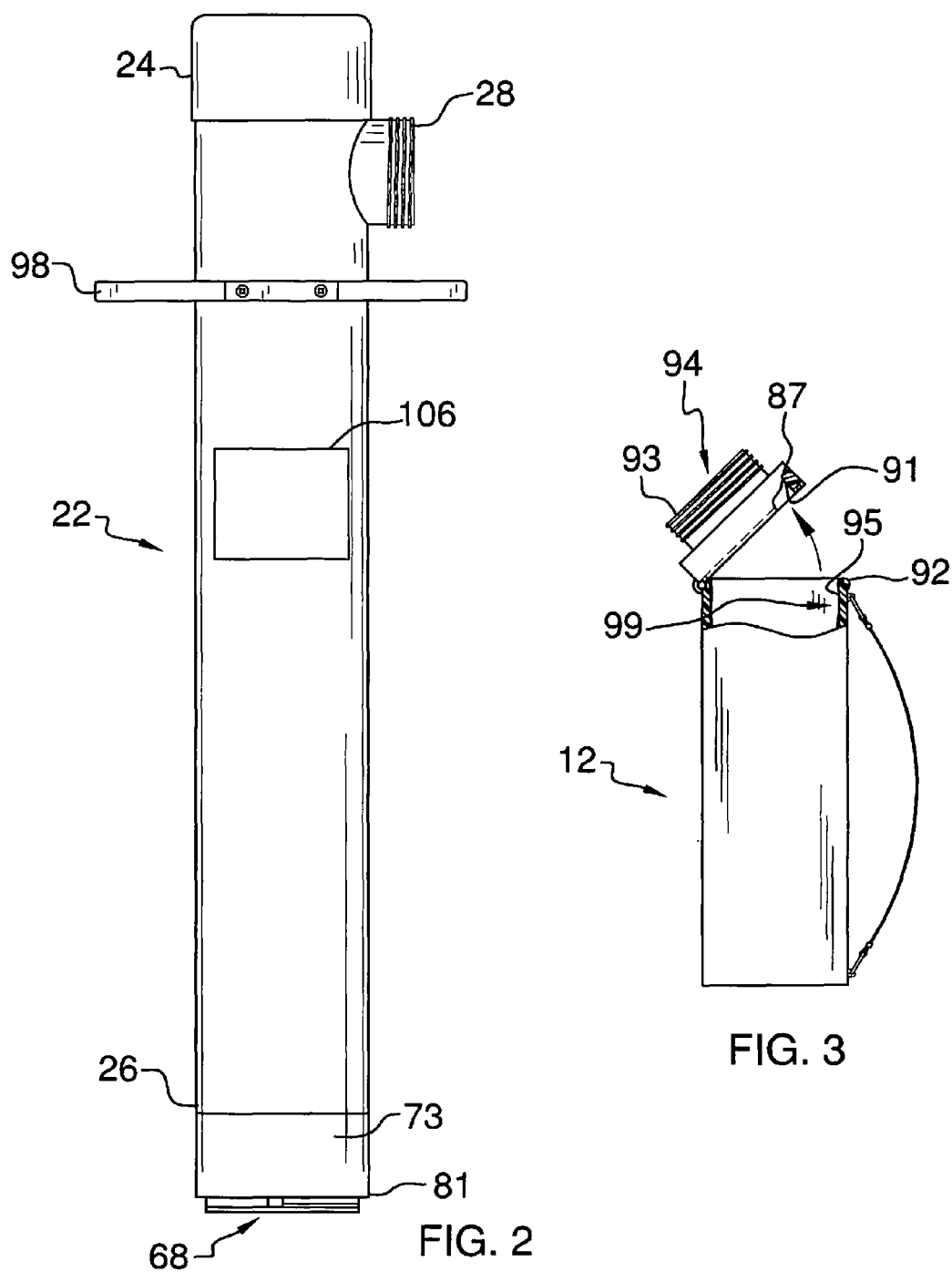

US 9,258,943 B1

PLANT EXTRACTION ASSEMBLY

BACKGROUND OF THE DISCLOSURE

Field of the Disclosure

The disclosure relates to plant extraction devices and more particularly pertains to a new plant extraction device for removing unwanted plants.

SUMMARY OF THE DISCLOSURE

An embodiment of the disclosure meets the needs presented above by generally comprising a housing that may be worn on a user's back. A flexible hose is coupled to and extends from the housing. The hose has a first end and a second end. The first end of the hose is in fluid communication with an interior of the housing. A tube is coupled to the second end of the hose. The tube is in fluid communication with the hose. The tube has a first end and a second end. A motor is coupled to the first end of the tube. A shaft is positioned within the tube. The shaft is operationally coupled to the motor so the shaft is rotated by the motor. A blade is coupled to the shaft so the blade is rotated by the shaft. The blade is positioned at the second end of the tube so the blade may contact a plant positioned adjacent to the second end of the tube. A propeller is coupled to the shaft. The propeller is rotated by the shaft so suction is provided from the second end of the tube into the tube. The propeller may urge pieces of the plant cut by the blade upwardly through the tube and the hose into the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is a right side cut-away view of an embodiment of the disclosure.

DESCRIPTION OF THE PREFERRED EMBODIMENT

Figure 1:
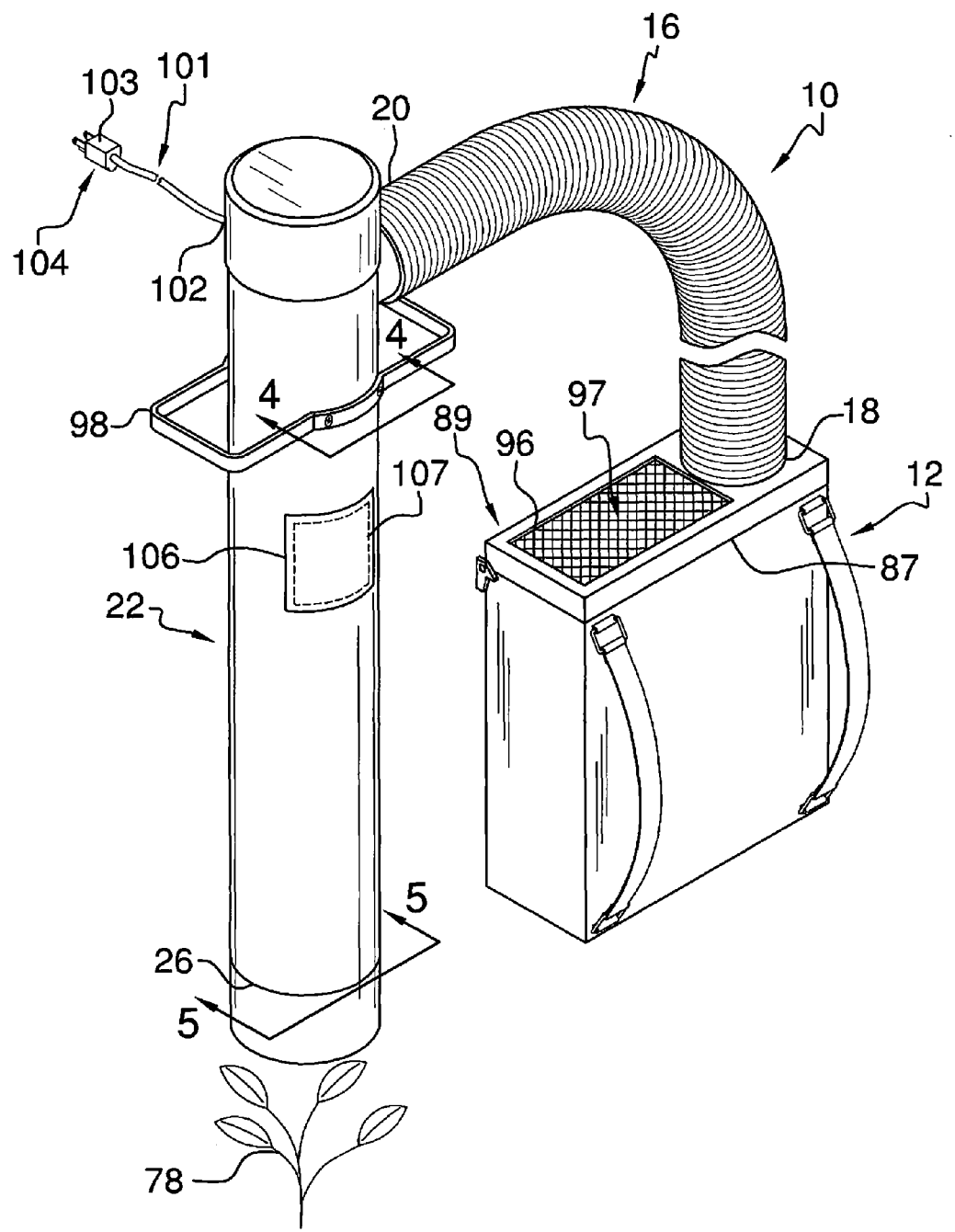
FIG. 1 is a perspective view of a plant extraction assembly according to an embodiment of the disclosure.
Figure 4:
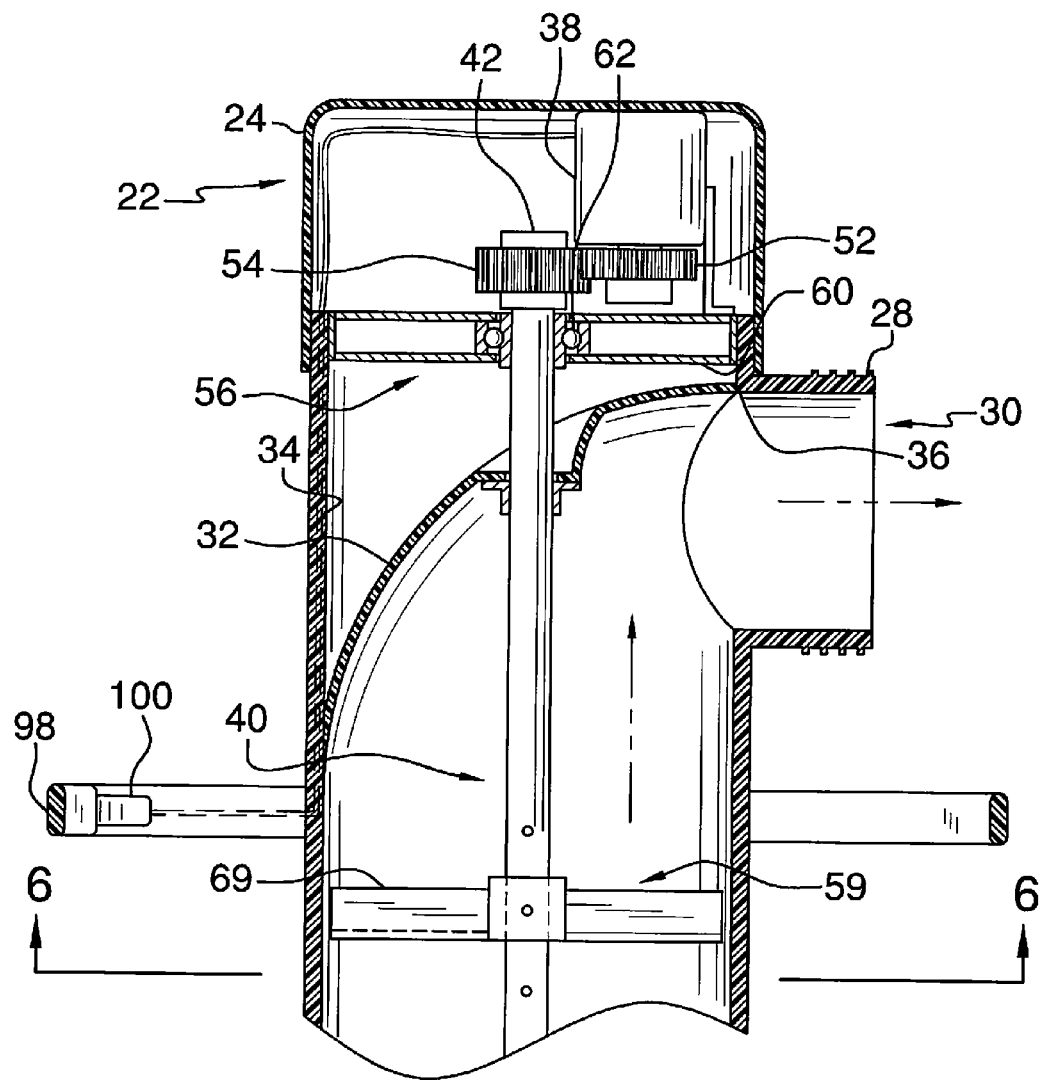
FIG. 4 is a cross sectional view taken along line 4-4 of FIG. 1 of an embodiment of the disclosure.
Figure 5:
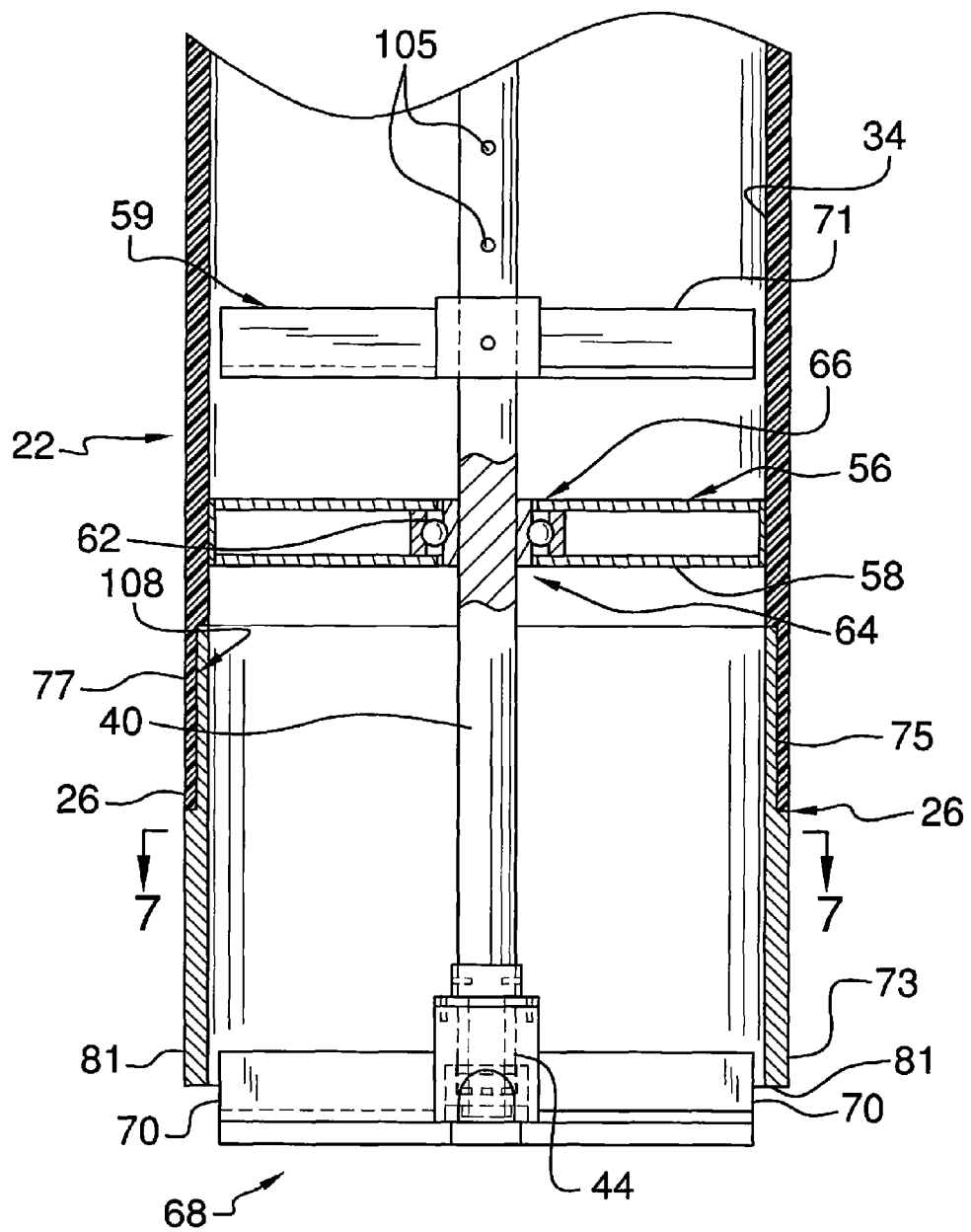
FIG. 5 is a cross sectional view taken along line 5-5 of FIG. 1 of an embodiment of the disclosure.
Figure 6:
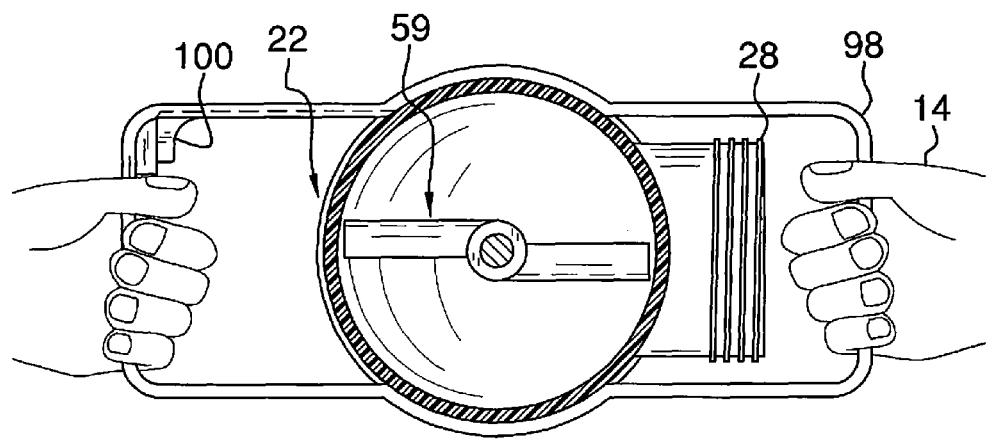
FIG. 6 is a cross sectional view taken along line 6-6 of FIG. 4 of an embodiment of the disclosure.
Figure 7:
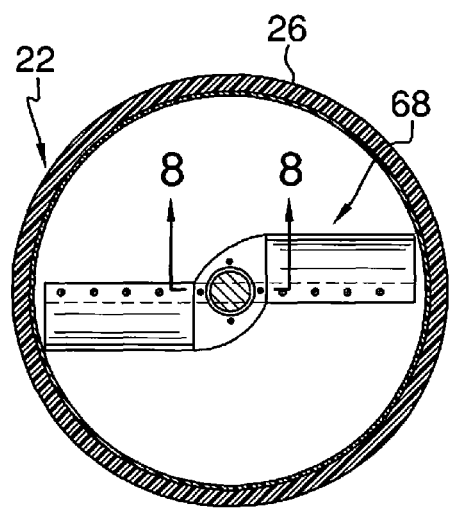
FIG. 7 is a cross sectional view taken along line 7-7 of FIG. 5 of an embodiment of the disclosure.
Figure 8:
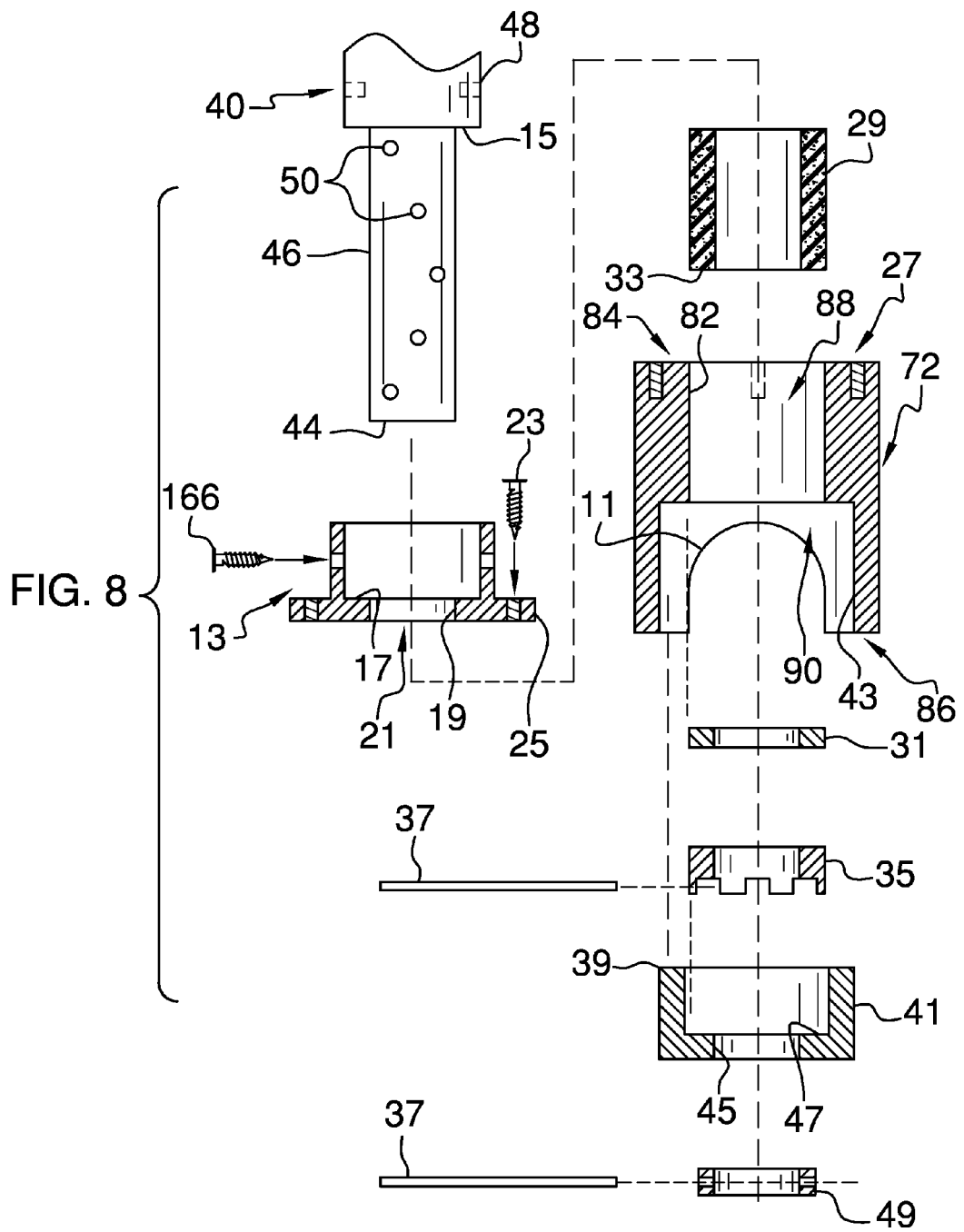
FIG. 8 is an exploded cross sectional view taken along line 8-8 of FIG. 7 of an embodiment of the disclosure.
Figure 9:
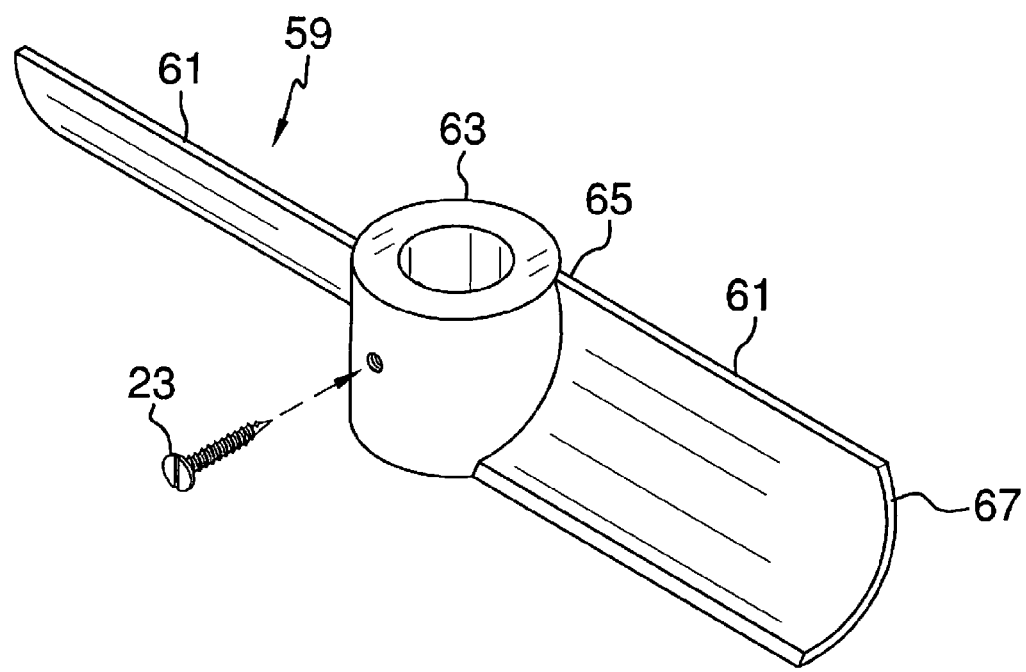
FIG. 9 is a top perspective view of an embodiment of the disclosure.
Figure 10:
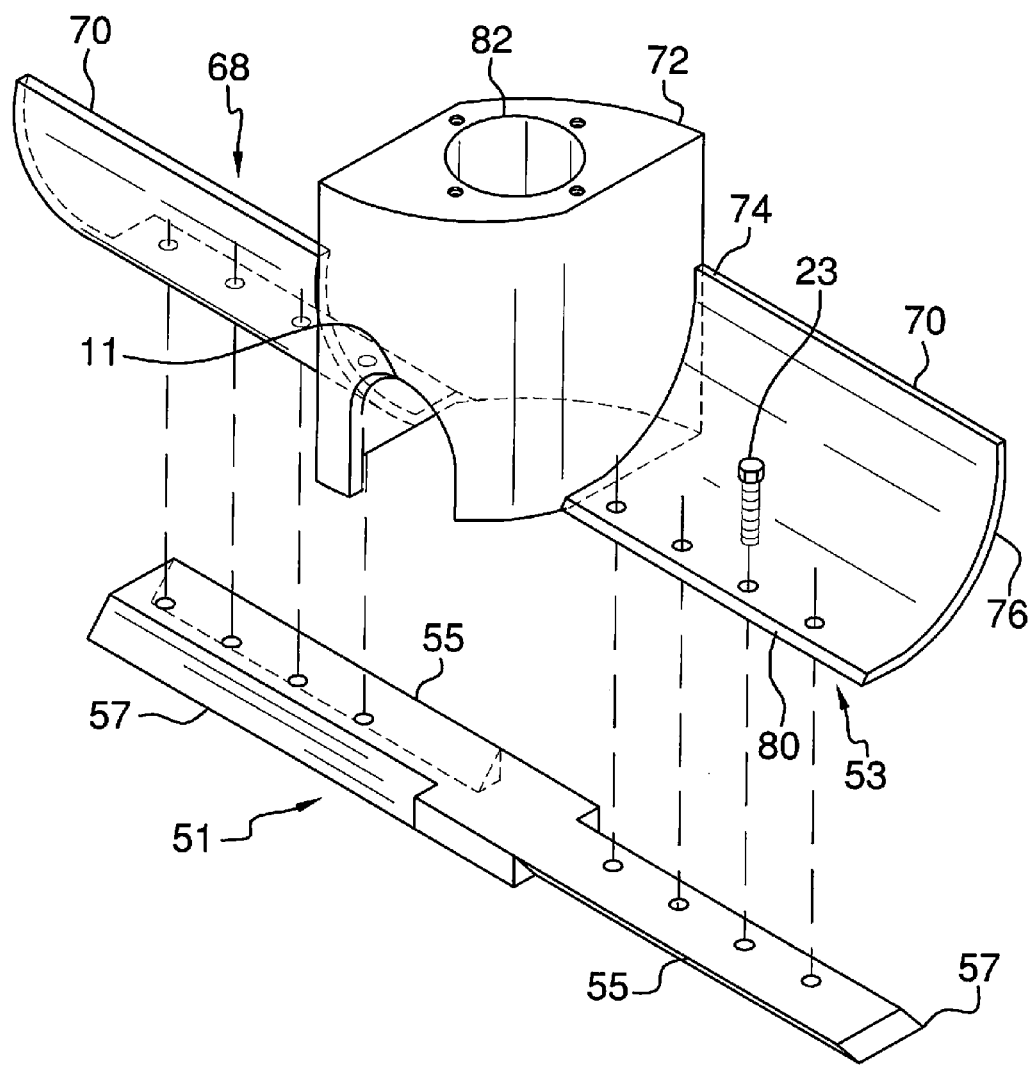
FIG. 10 is a side perspective view of an embodiment of the disclosure.

With reference now to the drawings, and in particular to FIGS. 1 through 12 thereof, a new plant extraction device embodying the principles and concepts of an embodiment of the disclosure and generally designated by the reference numeral 10 will be described.

As best illustrated in FIGS. 1 through 12, the plant extraction assembly 10 generally comprises a housing 12 that may be worn on a user 14. A flexible hose 16 is coupled to and extends from the housing 12. The hose 16 has a first end 18 and a second end 20. The first end 18 of the hose 16 is in fluid communication with an interior of the housing 12. The hose 16 may have a diameter between 7 cm and 12 cm. The hose 16 may have a length between 90 cm and 122 cm.

A tube 22 is coupled to the second end 20 of the hose 16. The tube 22 is in fluid communication with the hose 16. The tube 22 has a first end 24 and a second end 26. The first end 24 of the tube 22 is closed and the second end 26 of the tube 22 is open. The tube 22 may have a diameter between 12 cm and 18 cm. The tube 22 may have a length between 100 cm and 130 cm. A port 28 extends laterally from the tube 22. The port 28 is positioned proximal the first end 24 of the tube 22. An opening 30 extends through the port 28. The hose 16 is coupled to the port 28 around the opening 30. An access aperture 107 extends through the tube proximate the first end 24 of the tube 22 to access an interior of the tube 22. An access panel 106 is removably positioned over the access aperture 107.

A curved wall 32 is positioned within an interior of the tube 22. The curved wall 32 fixedly extends from an interior wall 34 of the tube 22 at a top 36 of the opening 30 through the port 28 to an opposite side of the tube 22 from the port 28. The curved wall 32 may direct a flow of air laterally out through the port 28 into the hose 16. The curved wall 32 sequesters the first end 24 of the tube 22 from the remaining interior of the tube 22.

A motor 38 is coupled to the first end 24 of the tube 22. The motor 38 may have an operational voltage between 110 volts AC and 120 volts AC. A shaft 40 has a first end 42, a second end 44, a coupling portion 46 and a remaining portion 48. The coupling portion 46 of the shaft 40 may have a diameter between 0.5 cm and 2 cm. The remaining portion 48 of the shaft 40 may have a diameter between 1.5 cm and 2.5 cm. A plurality of pin apertures 50 extends through the coupling portion 46 of the shaft 40. The pin apertures 50 are spaced longitudinally apart from each other.

The shaft 40 extends through the curved wall 32 such that the first end 42 of the shaft 40 is positioned proximate the first end 24 of the tube 22 and the second end 44 of the shaft 40 is positioned proximate the second end 26 of the tube 22. The shaft 40 may have a length between 95 cm and 125 cm. A first gear 52 is operationally coupled to the motor 38 so the motor 38 rotates the first gear 52. A second gear 54 is coupled to the first end 42 of the shaft 40. The first gear 52 engages the second gear 54 so the motor 38 rotates the shaft 40.

A bracket 56 is coupled to the inner wall 34 of the tube 22. The bracket 56 extends across an interior of the tube 22. The bracket 56 supports the shaft 40 in a central position extending through the tube 22. The bracket 56 may be one of a pair of brackets 56 or a plurality of brackets 56. A first one of the brackets 58 is positioned closer to the second end 26 of the tube 22. A second one of the brackets 60 is positioned closer to the first end 24 of the tube 22. A bearing 62 is coupled to a center 64 of the bracket 56. The shaft 40 extends through the bearing 62 such that the shaft 40 rotates freely within the bearing 62. The bearing 62 may be a friction reducing bearing 66 of any conventional design.

A blade 68 comprises a pair of blade arms 70 each extending outwardly from a central hub 72. The central hub 72 insertably receives the second end 44 of the shaft 40 so the blade 68 is rotated by the shaft 40. Each of the blade arms 70 has a semi-cylindrical cross section taken perpendicular to a longitudinal axis extending through a fixed end 74 and a free end 76 of each of the blade arms 70. The pair of blade arms 70 may each have a length between 5 cm and 7.5 cm. The blade 68 is positioned at the second end 26 of the tube 22 so the blade 68 may contact a plant 78 positioned adjacent to the second end 26 of the tube 22. A leading edge 80 of each of the blade arms 70 is sharpened so the blade 68 may cut the plant 78 when the blade 68 is rotated.

A shaft aperture 82 extends through a top end 84 and a bottom end 86 of the central hub 72. An interior of the central hub 72 comprises a top portion 88 and a bottom portion 90. The top portion 88 of the interior of the central hub 72 may have a diameter between 1.5 cm and 2.5 cm. The bottom portion 90 of the interior of the central hub 72 may have a diameter between 2.5 cm and 3.5 cm. A groove 11 extends laterally through the central hub 72. The groove 11 is positioned proximal the bottom end of 86 the central hub 72.

The central hub 72 further comprises a coupling plate 13 slidably coupled to the coupling portion 46 of the shaft 40. A bottom edge 15 of the remaining portion 48 of the shaft 40 abuts a top surface 17 of the coupling plate 13. The coupling portion 46 of the shaft 40 extends downwardly through a shaft aperture 19 extending through a bottom 21 of the coupling plate 13. A fastener 166 extends laterally through the coupling plate 13 and engages the shaft 40 so the fastener 166 may retain the coupling plate 13 on the shaft 40 acting as a clutch allowing the blade 68 to stop while the shaft 40 continues to rotate. Alternatively, an optional clutch override may be employed coupling the coupling plate 13 to the shaft 40. This may be achieved by tightening the fastener 166 sufficiently to fix the position of the coupling plate relative to the shaft 40 to prevent slippage between the coupling plate 13 and the shaft 40. The coupling plate 13 may have a width between 2.5 cm and 5 cm.

A plurality of fastener 23 each extends downwardly through a lip 25 coupled to and extending outwardly from the bottom 21 of the coupling plate 13. The fasteners 23 engage a top 27 of the central hub 72 so the fasteners 23 may couple the coupling plate 13 to the central hub 72. A bushing 29 is slidably positionable on the coupling portion 46 of the shaft 40 after the coupling plate 13 is positioned on the shaft 40. The bushing 29 is positioned within the top portion 88 of the interior of the central hub 72 after the shaft 40 is extended through the central hub 72. The bushing 29 may be comprised of a resiliently compressible material and frictionally coupled between the shaft 40 and the central hub 72 to define a clutch mechanism. Thus, the blade 68 can stop while the shaft 40 continues to rotate in the event the blade 68 strikes something hard or substantially immovable to inhibit damage to the blade 68.

A washer 31 is slidably positionable on the coupling portion 46 of the shaft 40 after the shaft 40 is extended through the central hub 72 such that the washer 31 abuts a bottom side 33 of the bushing 29. A secondary coupler 35 threadably engages the coupling portion 46 of the shaft 40. The secondary coupler 35 is coupled to the coupling portion 46 of the shaft 40 after the washer 31 is positioned on the shaft 40. The secondary coupler 35 may retain the washer 31 and the bushing 29 on the coupling portion 46 of the shaft 40. A pin 37 may be extended through the secondary coupler 35 such that the pin 37 extends through a selected one of the pin apertures 50 on the coupling portion 46 of the shaft 40. The pin 37 may prevent the secondary coupler 35 from spinning on the shaft 40.

A cup 39 insertably receives the coupling portion 46 of the shaft 40 after the shaft 40 is extended through the central hub 72. The cup 39 is positioned within the bottom portion 90 of the interior of the central hub 72 so an outside surface 41 of the cup 39 abuts an inner surface 43 of the bottom portion 90 of the interior of the central hub 72. The coupling portion 46 of the shaft 40 extends downwardly through a shaft aperture 45 extending through a bottom wall 47 of the cup 39.

A primary coupler 49 threadably engages the second end 44 of the shaft 40. The primary coupler 49 may retain the cup 39, the secondary coupler 35, the washer 31 and the bushing 29 within the interior of the central hub 72. The secondary coupler 35 and the washer 31 do not engage the cup 39. A pin 37 may be extended through the primary coupler 49 such that the pin 37 extends through a selected one of the pin apertures 50 on the coupling portion 46 of the shaft 40. The pin 37 may prevent the primary coupler 49 from spinning on the shaft 40.

A cutting bar 51 is coupled to a bottom 53 of the blade 68. A front 55 and a rear 57 edge of the cutting bar 51 are sharpened. The cutting bar 51 is positioned on the blade 68 such that the sharpened front edge 55 of the cutting bar 51 is coextensive with the leading edge 80 of the blade 68. The cutting bar 51 may be reversible so the rear edge 57 of the cutting bar 51 is coextensive with the leading edge 80 of the blade 68. A plurality of fasteners 23 extends downwardly through each of the blade arms 70 on the blade 68 and engages the cutting bar 51. The fasteners 23 retain the cutting bar 51 on the blade 68.

A propeller 59 comprises a pair of propeller arms 61 each extending outwardly from a central coupler 63. Alternatively, the propeller 59 may be one of a plurality of propellers 59. The shaft 40 extends through the central coupler 63 so the propeller 59 is rotated by the shaft 40. Each of the propeller arms 61 has a semi-cylindrical cross section taken perpendicular to a longitudinal axis extending through a fixed end 65 and a free end 67 of each of the propeller arms 61. Each of the propeller arms 61 may have a length between 5 and 7.5 cm.

Each of the propeller arms 61 produces a flow of air through the tube 22 when the propeller 59 is rotated. The propeller 59 may urge pieces of the plant 78 cut by the blade 68 upwardly through the tube 22 and the hose 16 into the housing 12. The propeller 59 may shred the plant 78. The propeller 59 may be one of a pair of propellers 59. A first one of the propellers 69 may be positioned on the shaft 40 closer to the first end 24 of the tube 22. A second one of the propellers 71 may be positioned on the shaft 40 closer to the second end 26 of the tube 22. A fastener 23 extends through the central coupler 63 and engages a selected one of a plurality of fastener apertures 105 that extends through the shaft 40.

Figure 11:
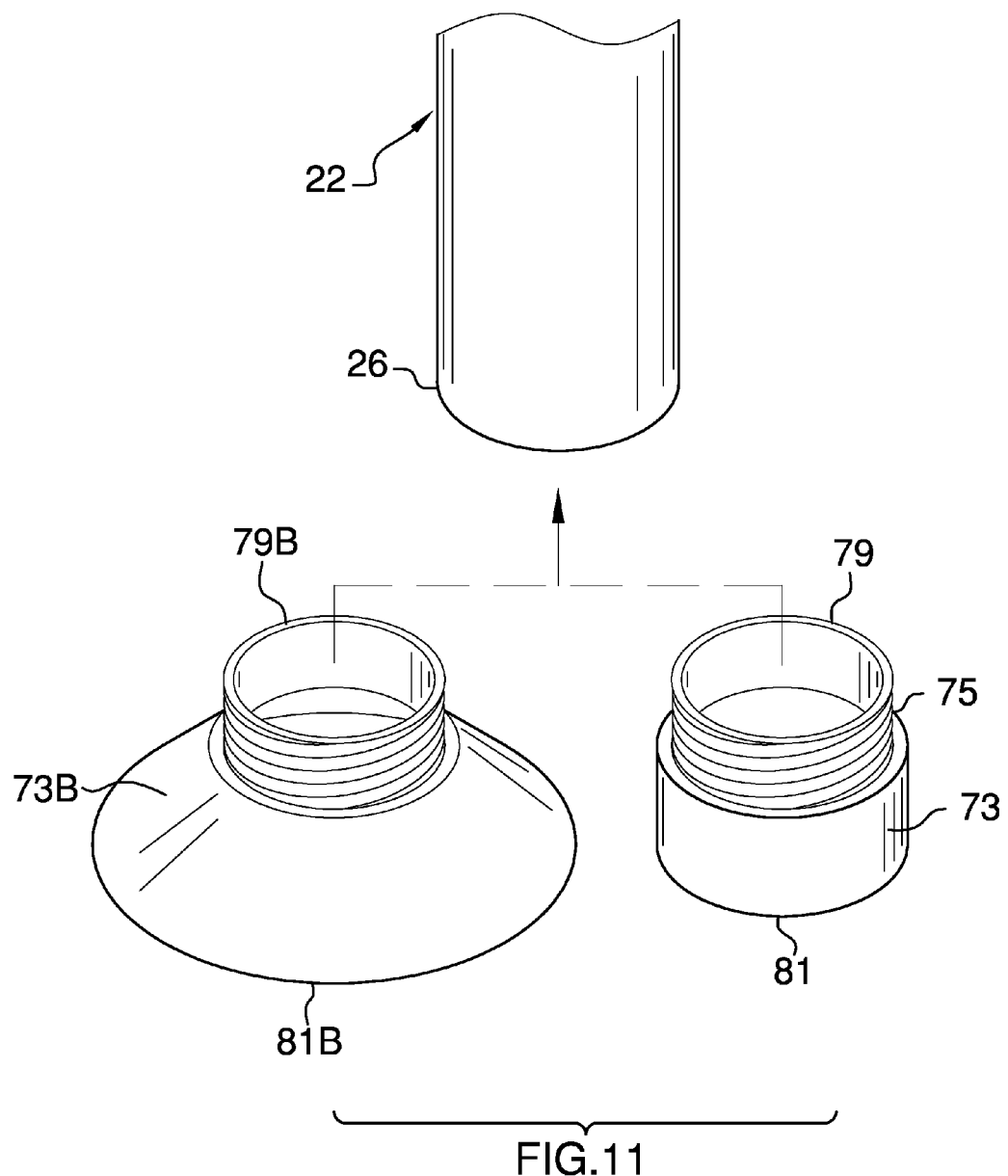
FIG. 11 is a front perspective view of an embodiment of the disclosure.

A sleeve 73 is coupled to the interior wall 34 of the tube 22 proximal the second end 26 of the tube 22. An outer surface 75 of an upper section of the sleeve 73 is threaded and engages threading 77 on an inner surface 108 of the tube 22. The sleeve 73 has an open top end 79 and an open bottom end 81. The open bottom end 81 of the sleeve 73 may have a diameter between 17 cm and 23 cm. The sleeve 73 provides added strength to the tube 22 but may also be structured to reduce a suction pressure at the second end 26 of the tube 22. As shown in FIG. 11, the sleeve 73 may be one of a pair of sleeves 73 and 73B. A diameter of the bottom end 81B of a first one of the sleeves 73B is larger than a diameter of the top end 79B of the first one of the sleeves 73B. A diameter of the bottom end 81 of a second one of the sleeves 73 is equal to a diameter of the top end 79 of the second one of the sleeves 73.

A lid 87 is hingedly coupled to a top 89 of the housing 12. The lid 87 is positionable in a closed position so the lid 87 closes the housing 12. The lid 87 is positionable in an open position to access an interior of the housing 12. An inner surface 91 of the lid 87 may engage a lip 92 positioned on the top 89 of the housing 12. The lid 87 may form an airtight seal with the top 89 of the housing 12. A housing port 93 is coupled to the lid 87. An opening 94 extends through the port 93 so the port 93 is in fluid communication with the interior of the housing 12. The first end 18 of the hose 16 may be coupled to the housing port 93.

A bag 95 is removably positioned within the interior of the housing 12. The bag 95 may receive the plant 78 from the tube 22. The bag 95 may be a garbage bag 99 of any conventional design. An air vent 96 extends through the lid 87 so the air vent 96 may allow air to escape the housing 12. The air vent 96 may facilitate a constant suction pressure in the tube 22. A screen 97 is coupled to the lid 87 such that the screen 97 completely covers the air vent 96. The screen 97 may prevent the plant 78 from escaping the housing 12.

A handle 98 is coupled to the tube 22. The handle 98 may be gripped by the user 14. The handle 98 may extend away from opposite sides of the tube 22. An actuator 100 is coupled to the handle 98. The actuator 100 is electrically coupled to the motor 38. The actuator 100 selectively actuates the motor 38 between a minimum rotational speed and a maximum rotational speed.

A cord 101 has a first 102 a second 103 end. The first end 102 of the cord 101 is electrically coupled to the motor 38. The second end 103 of the cord comprises a male electrical plug 104. The male electrical plug 104 may be electrically coupled to a female electrical outlet. The cord 101 may have a length between 3 m and 5 m. Alternatively, the assembly 10 may be powered by a gas engine.

Figure 12:
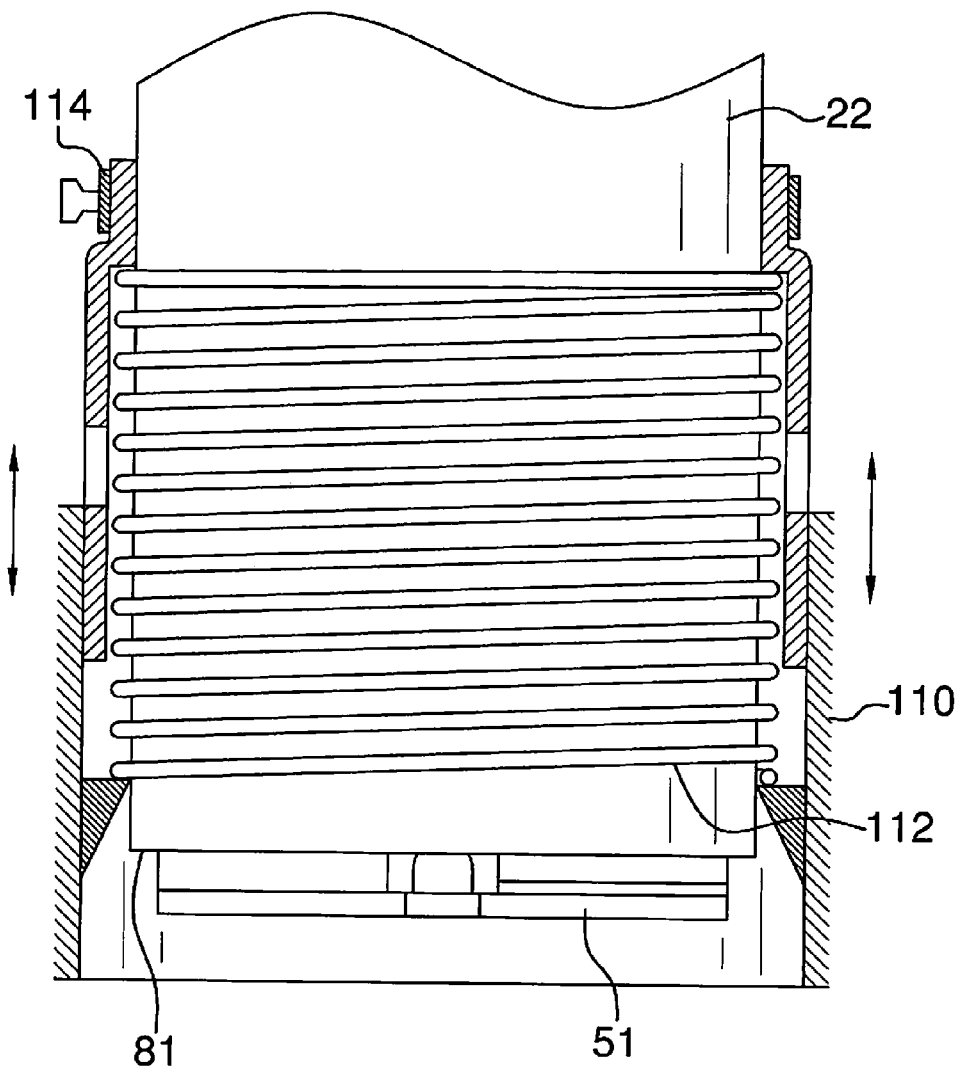
FIG. 12 is a partial cut-away front perspective of an embodiment of the disclosure.

As shown in FIG. 12, a biased shroud 110 may be clamped to the tube 22 extending around the tube 22 and downwardly past the second end 26 of the tube 22 and the bottom end 81 of the sleeve 73. The shroud 110 further extends below the cutting bar 51 wherein the shroud 110 contacts the ground prior to the cutting bar 51 as the tube 22 is lowered towards the ground. Contact with the ground urges the shroud 110 to compress a biasing member 112 coupled to and extending between the shroud 110 and a connection clamp 114 coupled to the tube 22. Alternatively, the connection clamp 114 may also be coupled directly to the sleeve 73.

In use, the second end 26 of the tube 22 may be positioned proximal the plant 78. The actuator 100 may be actuated so the motor 38 rotates at the desired speed to remove the plant to be deposited in the bag 95. When the bag 95 becomes full, the bag 95 may be removed from the housing 12 so the bag 95 may be emptied or discarded and replaced by another. The blade 68 may be used with or without the cutting bar 51 coupled to the blade 68. The assembly 10 may be used with or without the sleeve 73 being coupled to the tube 22. The assembly may be used without the sleeve 73 to expose the blade 68 in order to remove a heavily embedded plant 78. The access panel 106 may be removed in order to remove plant 78 debris that may become stuck within the tube 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A plant extraction assembly comprising:
   a housing configured to be worn on a user's back;
   a flexible hose coupled to and extending from said housing, said hose having a first end and a second end, said first end of said hose being in fluid communication with an interior of said housing;
   a tube coupled to said second end of said hose, said tube being in fluid communication with said hose, said tube having a first end and a second end;
   a motor coupled to said first end of said tube;
   a shaft positioned within said tube, said shaft being operationally coupled to said motor wherein said shaft is rotated by said motor;
   a blade coupled to said shaft wherein said blade is rotated by said shaft, said blade being positioned at said second end of said tube wherein said blade is configured to contact a plant positioned adjacent to said second end of said tube, said blade comprising a central hub;
   a propeller coupled to said shaft wherein said propeller is rotated by said shaft wherein suction is provided from said second end of said tube into said tube wherein said propeller is configured to urge pieces of the plant cut by said blade upwardly through said tube and said hose into said housing;
   a shaft aperture extending through a top end and a bottom end of said central hub, an interior of said central hub comprising a top portion and a bottom portion, said top portion of the interior of said central hub having a diameter being less than a diameter of said bottom portion of the interior of said central hub;
   a groove extending laterally through said central hub, said groove being positioned proximal said bottom end of said central hub; and
   said central hub further comprising
      a coupling plate slidably coupled to a coupling portion of said shaft such that a bottom edge of a remaining portion of said shaft abuts a top surface of said coupling plate and said coupling portion of said shaft extends downwardly through a shaft aperture extending through a bottom of said coupling plate;
      a fastener extending laterally through said coupling plate and engaging said shaft, wherein said fastener retains said coupling plate on said shaft;
      a plurality of fasteners each extending downwardly through a lip coupled to and extending outwardly from said bottom of said coupling plate, said fasteners engaging a top of said central hub, wherein said fasteners couple said coupling plate to said central hub;
      a bushing slidably positionable on said coupling portion of said shaft after said coupling plate is coupled to said shaft, said bushing being positioned within said top portion of the interior of said central hub after said shaft is extended through said central hub;
a washer slidably positionable on said coupling portion of said shaft after said shaft is extended through said central hub such that said washer abuts a bottom side of said bushing;
a secondary coupler engaging said coupling portion of said shaft, said secondary coupler being coupled to said coupling portion of said shaft after said washer is positioned on said shaft, wherein said secondary coupler retains said washer and said bushing on said coupling portion of said shaft;
a cup insertably receiving said coupling portion of said shaft after said shaft is extended through said central hub such that said cup is positioned within said bottom portion of the interior of said central hub, said coupling portion of said shaft extending downwardly through a shaft aperture extending through a bottom wall of said cup; and
a primary coupler threadably engaging a second end of said shaft, wherein said primary coupler retains said cup, said secondary coupler, said washer and said bushing within the interior of said central hub.

2. The assembly according to claim 1, further comprising:
a port extending laterally from said tube;
an opening extending through said port; and
said hose being coupled to said port around said opening.

3. The assembly according to claim 2, further comprising a curved wall positioned within an interior of said tube, said curved wall fixedly extending from an interior wall of said tube at a top of said opening through said port to an opposite side of said tube from said port wherein said curved wall is configured to direct a flow of air laterally out through said port into said hose.

4. The assembly according to claim 3, further comprising:
said shaft comprising a first end, said shaft extending through said curved wall such that said first end of said shaft is positioned proximate said first end of said tube and said second end of said shaft is positioned proximate said second end of said tube.

5. The assembly according to claim 4, further comprising:
a first gear operationally coupled to said motor wherein said motor rotates said first gear; and
a second gear coupled to said first end of said shaft, said first gear engaging said second gear wherein said motor rotates said shaft.

6. The assembly according to claim 1, further comprising a bracket coupled to an inner wall of said tube, said bracket extending across an interior of said tube, said bracket supporting said shaft in a central position extending through said tube.

7. The assembly according to claim 6, further comprising a bearing coupled to a center of said bracket, said shaft extending through said bearing such that said shaft rotates freely within said bearing.

8. The assembly according to claim 7, further comprising said bracket being one of a pair of brackets, a first one of said brackets being positioned closer to said second end of said tube, a second one of said brackets being positioned closer to said first end of said tube.

9. The assembly according to claim 1, further comprising said propeller comprising a pair of propeller arms each extending outwardly from a central coupler, said shaft extending through said central coupler, each of said propeller arms having a semi-cylindrical cross section taken perpendicular to a longitudinal axis extending through a fixed end and a free end of each of said propeller arms, wherein each of said propeller arms produces a flow of air through said tube when said propeller is rotated.

10. The assembly according to claim 1, further comprising said propeller being one of a pair of propellers, a first one of said propellers being positioned on said shaft closer to said first end of said tube, a second one of said propellers being positioned on said shaft closer to said second end of said tube.

11. The assembly according to claim 1, further comprising:
said shaft comprising a first end;
said blade comprising a pair of blade arms each extending outwardly from the central hub, said central hub insertably receiving said second end of said shaft; and
each of said blade arms having a semi-cylindrical cross section taken perpendicular to a longitudinal axis extending through a fixed end and a free end of each of said blade arms, a leading edge of each of said blade arms being sharpened, wherein said blade is configured to cut the plant when said blade is rotated.

12. The assembly according to claim 11, further comprising
a cutting bar coupled to a bottom of said blade, a front and a rear edge of said cutting bar being sharpened, said cutting bar being positioned on said blade such that said sharpened front edge of said cutting bar is coextensive with said leading edge of said blade arms; and
a plurality of fasteners extending downwardly through each of said blade arms on said blade and engaging said cutting bar, wherein said fasteners retain said cutting bar on said blade.

13. The assembly according to claim 1, further comprising a sleeve coupled to an interior wall of said tube proximal said second end of said tube, an outer surface of said sleeve being threaded, said sleeve having an open top end and an open bottom end.

14. The assembly according to claim 13, further comprising:
said sleeve being one of a pair of said sleeves, said open bottom end of a first one of said sleeves having a diameter being larger than a diameter of said open top end of said first one of said sleeves, said open bottom end of a second one of said sleeves having a diameter being equal to a diameter of said open top end of said second one of said sleeves.

15. The assembly according to claim 1, further comprising:
a lid hingedly coupled to a top of said housing, said lid being positionable in a closed position having said lid close said housing, said lid being positionable in an open position to access the interior of said housing;
a retainer coupled to said housing, said retainer selectively engaging said lid to retain said lid in said closed position;
a bag removably positioned within the interior of said housing, wherein said bag is configured to receive the plant from said tube;
an air vent extending through said lid, wherein said air vent is configured to allow air to escape said housing; and
a screen coupled to said lid such that said screen completely covers said air vent, wherein said screen is configured to prevent the plant from escaping said housing.

16. The assembly according to claim 1, further comprising:
a handle coupled to said tube, wherein said handle is configured to be gripped by a user;
an actuator coupled to said handle, said actuator being electrically coupled to said motor, said actuator selectively actuating said motor between a minimum rotational speed and a maximum rotational speed; and a cord having a first end and a second end, said first end of said cord being electrically coupled to said motor, said second end of said cord comprising a male electrical plug, wherein said male electrical plug is configured to be electrically coupled to a female electrical outlet.

17. A plant extraction assembly comprising:

a housing configured to be worn on a user's back;

a flexible hose coupled to and extending from said housing, said hose having a first end and a second end, said first end of said hose being in fluid communication with an interior of said housing;

a tube coupled to said second end of said hose, said tube being in fluid communication with said hose, said tube having a first end and a second end;

a port extending laterally from said tube;

an opening extending through said port, said hose being coupled to said port around said opening;

a curved wall positioned within an interior of said tube, said curved wall fixedly extending from an interior wall of said tube at a top of said opening through said port to an opposite side of said tube from said port wherein said curved wall is configured to direct a flow of air laterally out through said port into said hose;

a motor coupled to said first end of said tube;

a shaft including a first end and a second end, said shaft extending through said curved wall such that said first end of said shaft is positioned proximate said first end of said tube and said second end of said shaft is positioned proximate said second end of said tube;

a first gear operationally coupled to said motor wherein said motor rotates said first gear;

a second gear coupled to said first end of said shaft, said first gear engaging said second gear wherein said motor rotates said shaft;

a bracket coupled to said interior wall of said tube, said bracket extending across the interior of said tube, said bracket supporting said shaft in a central position extending through said tube, said bracket being one of a pair of brackets, a first one of said brackets being positioned closer to said second end of said tube, a second one of said brackets being positioned closer to said first end of said tube;

a bearing coupled to a center of said bracket, said shaft extending through said bearing such that said shaft rotates freely within said bearing;

a blade comprising a pair of blade arms each extending outwardly from a central hub, said central hub insertably receiving said second end of said shaft wherein said blade is rotated by said shaft, each of said blade arms having a semi-cylindrical cross section taken perpendicular to a longitudinal axis extending through a fixed end and a free end of each of said blade arms, a leading edge of each of said blade arms being sharpened, wherein said blade is configured to cut a plant when said blade is rotated, said blade being positioned at said second end of said tube wherein said blade is configured to contact a plant positioned adjacent to said second end of said tube;

said central hub further comprising a coupling plate slidably coupled to a coupling portion of said shaft such that a bottom edge of a remaining portion of said shaft abuts a top surface of said coupling plate and said coupling portion of said shaft extends downwardly through a shaft aperture extending through a bottom of said coupling plate;

a fastener extending laterally through said coupling plate and engaging said shaft, wherein said fastener retains said coupling plate on said shaft;

a plurality of fasteners each extending downwardly through a lip coupled to and extending outwardly from said bottom of said coupling plate, said fasteners engaging a top of said central hub, wherein said fasteners couple said coupling plate to said central hub;

a bushing slidably positionable on said coupling portion of said shaft after said coupling plate is coupled to said shaft, said bushing being positioned within a top portion of an interior of said central hub after said shaft is extended through said central hub;

a washer slidably positionable on said coupling portion of said shaft after said shaft is extended through said central hub such that said washer abuts a bottom side of said bushing;

a secondary coupler threadably engaging said coupling portion of said shaft, said secondary coupler being coupled to said coupling portion of said shaft after said washer is positioned on said shaft, wherein said secondary coupler retains said washer and said bushing on said coupling portion of said shaft;

a cup insertably receiving said coupling portion of said shaft after said shaft is extended through said central hub such that said cup is positioned within a bottom portion of the interior of said central hub, said coupling portion of said shaft extending downwardly through a shaft aperture extending through a bottom wall of said cup; and a primary coupler threadably engaging said second end of said shaft, wherein said primary coupler retains said cup, said secondary coupler, said washer and said bushing within the interior of said central hub;

a shaft aperture extending through a top end and a bottom end of said central hub, said top portion of the interior of said central hub having a diameter being less than a diameter of said bottom portion of the interior of said central hub;

a groove extending laterally through said central hub, said groove being positioned proximal said bottom end of said central hub;

a cutting bar coupled to a bottom of said blade, a front and a rear edge of said cutting bar being sharpened, said cutting bar being positioned on said blade such that said sharpened front edge of said cutting bar is coextensive with said leading edge of said blade arms;

a plurality of fasteners extending downwardly through each of said blade arms on said blade and engaging said cutting bar, wherein said fasteners retain said cutting bar on said blade;

a propeller comprising a pair of propeller arms each extending outwardly from a central coupler, said shaft extending through said central coupler wherein said propeller is rotated by said shaft, each of said propeller arms having a semi-cylindrical cross section taken perpendicular to a longitudinal axis extending through a fixed end and a free end of each of said propeller arms, wherein each of said propeller arms produces a flow of air through said tube when said propeller is rotated wherein said propeller is configured to urge pieces of the plant cut by said blade upwardly through said tube and said hose into said housing, said propeller being one of a pair of propellers, a first one of said propellers being positioned on said shaft closer to said first end of said tube, a second one of said propellers being positioned on said shaft closer to said second end of said tube;

a sleeve coupled to said interior wall of said tube proximal said second end of said tube, an outer surface of said sleeve being threaded;

a lid hingedly coupled to a top of said housing, said lid being positionable in a closed position having said lid close said housing, said lid being positionable in an open position to access the interior of said housing;

a retainer coupled to said housing, said retainer selectively engaging said lid to retain said lid in said closed position;

a bag removably positioned within the interior of said housing, wherein said bag is configured to receive the plant from said tube;

an air vent extending through said lid, wherein said air vent is configured to allow air to escape said housing;

a screen coupled to said lid such that said screen completely covers said air vent, wherein said screen is configured to prevent the plant from escaping said housing;

a handle coupled to said tube, wherein said handle is configured to be gripped by a user;

an actuator coupled to said handle, said actuator being electrically coupled to said motor, said actuator selectively actuating said motor between a minimum rotational speed and a maximum rotational speed; and a cord having a first end and a second end, said first end of said cord being electrically coupled to said motor, said second end of said cord comprising a male electrical plug, wherein said male electrical plug is configured to be electrically coupled to a female electrical outlet.

\* \* \* \* \*